United States Patent

Weaver

[11] 3,923,941
[45] Dec. 2, 1975

[54] PROCESS FOR PRODUCING A MARBLEIZED PLASTIC SHEET

[75] Inventor: John B. Weaver, Lancaster, Pa.

[73] Assignee: Armstrong Cork Company, Lancaster, Pa.

[22] Filed: Oct. 10, 1972

[21] Appl. No.: 296,110

Related U.S. Application Data

[62] Division of Ser. No. 87,068, Nov. 5, 1970, abandoned.

[52] U.S. Cl. ............... 264/73; 156/247; 264/75; 264/245
[51] Int. Cl. ................................................ B05c 5/02
[58] Field of Search ....... 117/39, 43, 44, 45, 111 H, 117/111 R, 111 A; 156/247; 161/406; 264/73, 245

[56] References Cited
UNITED STATES PATENTS

| | | | |
|---|---|---|---|
| 2,813,052 | 11/1957 | Lancaster | 161/88 |
| 2,977,320 | 3/1961 | Jenkins | 117/37 R X |
| 3,049,761 | 8/1962 | Yakubik | 18/57 |
| 3,106,480 | 10/1963 | Baker | 117/43 |
| 3,155,540 | 11/1964 | Loeffler et al. | 118/60 |
| 3,265,548 | 8/1966 | Harkins et al. | 156/79 |
| 3,293,063 | 12/1966 | Pohl et al. | 117/45 |
| 3,479,197 | 11/1969 | Mork | 117/12 |

FOREIGN PATENTS OR APPLICATIONS 837,566    3/1970    Canada.............................. 156/247

*Primary Examiner*—Thomas J. Herbert, Jr.
*Assistant Examiner*—Bruce H. Hess

[57] ABSTRACT

Multiple plastisol compositions having differing decorative characteristics are simultaneously individually fed to a receptacle to form a heterogeneous mixture thereof. An applicator ball is positioned in an opening in the receptacle's bottom. Rotation of the ball during an oscillating movement of the receptacle, with the ball in contact with a moving substrate, produces a marbleizing effect in the coating applied thereby. Heat is used to gel the marbleized coating. A clear, unfilled plastisol coating is applied over the marbleized coating and the coatings are then heat fused.

5 Claims, 3 Drawing Figures

U.S. Patent   Dec. 2, 1975   3,923,941
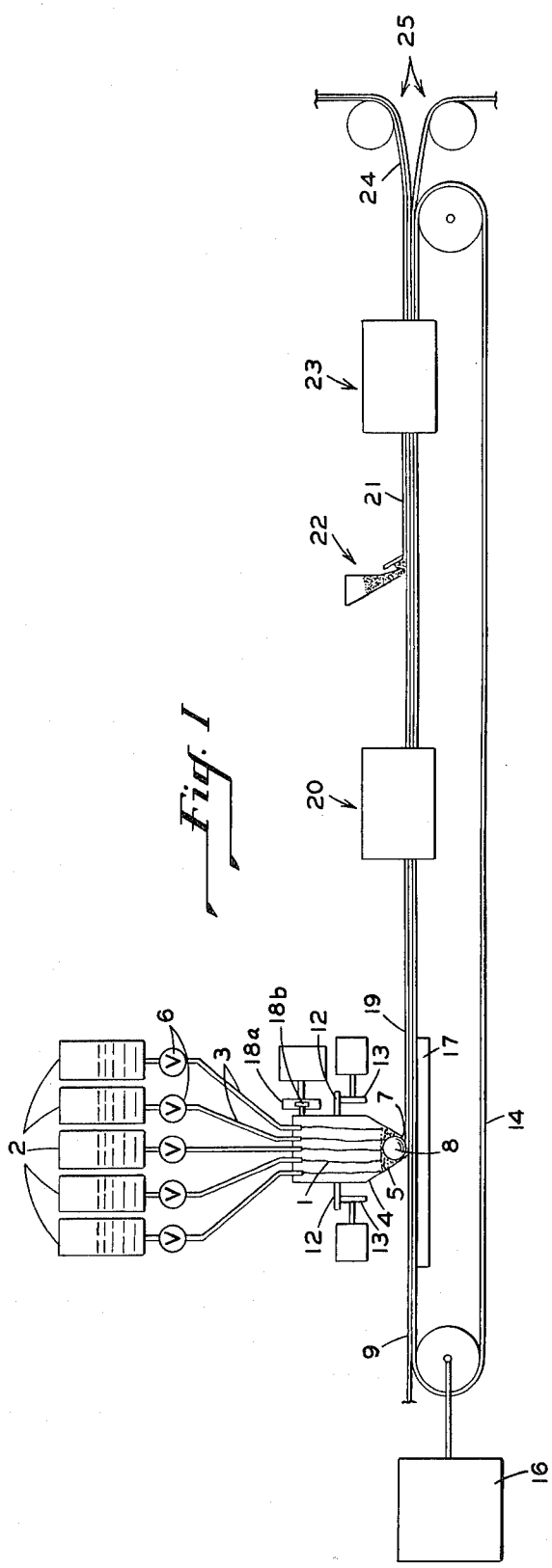
Fig. I
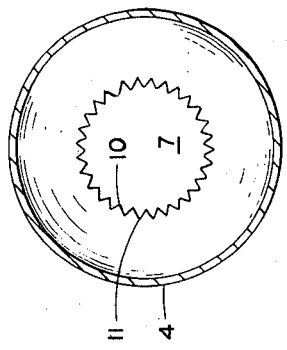
Fig. III
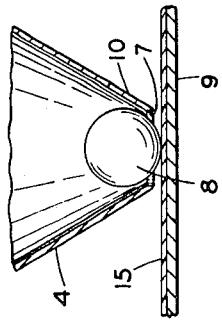
Fig. II

PROCESS FOR PRODUCING A MARBLEIZED PLASTIC SHEET

This is a division of application Ser. No. 87,068, filed Nov. 5, 1970, now abandoned.

BACKGROUND OF THE INVENTION

1. Field of the Invention

The invention relates to a new method and apparatus for producing a marbleized sheet from a heterogeneous mixture of a combination of vari-colored and uncolored plastisols, and more particularly, to the production of a marbleized sheet by applying the plastisol mixture to a moving substrate by means of a ball positioned in the dispensing opening of a feed receptacle as they are moved with an oscillating motion over the substrate surface.

2. Description of the Prior Art

Numerous prior attempts have been made to achieve marbleized or somewhat similar decorative patterns in plastic sheet material. U.S. Pat. No. 3,219,735, for example, discloses coating of a substrate with a pigmented curable resinous coat; allowing the base coat to set up for a sufficient length of time to form an uncured, but friable film on the surface thereof; application of one or more discontinuous pigmented curable resinous coatings onto the base coat; subjecting the substrate to action to cause the discontinuous coating to slide or flow in relation to the base coating and, allowing the decorative coating to set up and harden.

U.S. Pat. No. 3,341,936, teaches application of a pigmented base layer of a curable synthetic resinous liquid coating material to a surface, followed by the application of at least one color pigment of a different color in a random discontinuous pattern overlying the base layer. A substantially transparent layer of the curable resinous liquid coating material is then applied and, before the coating layers have set, the surface of the top layer is acted upon to initiate surface movement only, to induce by wave motion, subsurface flow and diffusion of the pigmented intermediate layer.

U.S. Pat Nos. 2,544,622 and 2,615,271 relate to a method and apparatus for forming a patterned pigmented plastic sheet comprising, applying to a support, a thin fluid film of an organic film-forming material which may contain pigment and a solvent and, vibrating the support until the solvent has evaporated and the film solidified.

The formation of a multi-colored sheeting is also disclosed by U.S. Pat. No. 3,049,761, wherein granulated resins of various colors are mixed with a plastisol paste and this mixture is formed into a sheet, fused and pressed.

Other prior methods include the dropping of colored plastisol paste onto a solid sheet of resin just before it enters a calender. This squeezes the plastisol paste into the base sheet forming a composite sheet which may have several different colors. The milling together of differently colored pieces of resinous material to form a multi-colored sheet has, of course, also been known.

From the foregoing, it can be seen that some of these prior processes involved the application of separate multiple coatings, the necessity of causing shifting, separating, or intermingling of the coatings and, the loss of time waiting for setting-up, etc. The remaining prior processes above were incapable of producing a controllable and substantially reproducible patterned marbleized sheet such as that of the present invention, which invention further results in an improved marbleized sheet with fewer necessary steps and a saving in time and expense.

SUMMARY OF THE INVENTION

The invention herein is directed to a method and apparatus for producing a marbleized plastic sheet wherein clear, colored and translucent plastisols are simultaneously individually fed to the top surface of a ball which is positioned in the bottom opening of a feed receptacle. The ball and receptacle are positioned above the surface of a substrate, with the ball in rolling contact therewith. The substrate's surface may or may not have a release coating thereon depending on whether or not retention of the substrate backing is desired. Movement, preferably oscillating, of the receptacle and ball, and movement of the substrate, thus results in rotation of the ball and deposition thereby of a marbleized plastisol coating on the substrate. The marbleized layer is then heat gelled and an additional coating of a clear, unfilled, unpigmented plastisol is applied thereover and the two coatings heat fused to form the finished sheet which may be retained on, or stripped from the substrate.

It is therefore an object of this invention to set forth an improved method and apparatus for producing a marbleized plastic sheet wherein a system is provided for programming a wide variety of patterns, each of which is controllable, substantially reproducible and, extends through the thickness of the sheet. Further, the extra steps, time and expense encountered in the prior methods of producing a marbleized sheet are eliminated.

BRIEF DESCRIPTION OF THE DRAWING

FIG. I is a diagrammatic side elevational view of the apparatus used in the method of this invention; FIG. II is a sectional elevational view, partially broken away, of the receptacle, fluid applicator and substrate as they appear in use and, FIG. III is a sectional top plan view of the receptacle with the fluid applicator removed to show the receptacle's notched dispensing opening.

DESCRIPTION OF THE PREFERRED EMBODIMENT

The marbleized sheet of this invention may be made with apparatus of the type shown in FIGS. I, II, and III of the drawings.

In making the marbleized sheet, multiple streams of plastisol 1 are fed from supply containers 2 through conduits 3 to a receptacle 4 to form a heterogeneous mixture 5. The amount of plastisol flowing through the conduits 3 may be individually controlled by means of valves 6 therein, to control and influence the character of the marbleized sheet of this invention.

While only one receptacle and attendant apparatus is shown, it will be understood that any number of these assemblies may be mounted across the path of the substrate's travel and, that they may be mounted, for example, in parallel, staggered or tandem patterns. It will be further understood such multiple assemblies may be programmed to operate in synchronized and overlapping patterns, all of which may be reproduced within a predetermined cycle.

Each receptacle 4 has a circular opening 7 in its bottom portion, which retains a rotatable, spherical, fluid-applicator 8 which may have a smooth, or a textured surface. The fluid-applicator 8, when not in contact with the substrate 9, rests on the rim 10 of the opening 7. The rim 10 of the opening 7 is preferably serrated as shown in FIG. III at 11 to further facilitate the flow of plastisol and minimize friction between the applicator 8 and the rim's edge. In operation, however, with the applicator 8 in contact with substrate 9, receptacle 4 will be spaced above substrate 9 a distance sufficient to allow the applicator 8 to rotate freely in spaced relationship with the rim 10 of the opening 7.

The receptacle 4 may be positioned by means of members 12, resting on cams 13, over a conveyor belt 14 which carries the substrate 9 thereon. Receptacle 4, therefore, may be intermittently raised and lowered by means of members 12 and cams 13 for purposes of achieving desired design effects. Also, the spacing between the receptacle 4 and the substrate 9 and, the space between the applicator 8 and the rim 10 of the opening 7 may be varied by means of members 12 and cams 13 while the fluid-applicator 8 is in contact with substrate 9 to regulate the flow of plastisol from the receptacle 4. The substrate 9 may carry a non-adherent coating 15, if it is desired to strip the marbleized sheet from the substrate. However, if it is desired to retain the substrate 9 as a permanent backing, coating 15 may be eliminated and the marbleized sheet secured to the substrate in a known manner.

As conveyor belt 14 is driven by drive means 16, it moves across a conveyor support means 17. Since, in operation the fluid-applicator 8 is in contact with substrate 9, carried on conveyor belt 14, applicator 8 is caused to rotate due to frictional contact therewith. As applicator 8 rotates, it is also caused to move in an oscillating pattern on the surface of substrate 9 by means of cam 18a and roller arrangement 18b. Obviously, the pattern, speed and program, of cam 18a may be varied to produce a wide variety of patterns. As the applicator 8 rotates and is laterally oscillated it carries the partially mixed plastisol 5 onto substrate 9 producing a marbleized coating 19 thereon. The marbleized coating 19 is then gelled by passing it through heating means 20.

The plastisol is preferably fed to receptacle 4 at a rate approximately equal to the rate at which it is being dispensed therefrom. Usually, the amount of plastisol in the receptacle is just enough to cover the applicator. This avoids churning and consequent complete mixing of the different colors and results in much better definition of design in the finished product.

A clear, unfilled, unpigmented top coating 21 may then be applied by means of a doctor blade and material supply arrangement such as shown by numeral 22 to level the grained or textured profile of the marbleized coating 19. If it is desired to retain the textured profile of the marbleized coating 19, clear coating 21 may be applied, as by the well-known curtain coating technique in an amount sufficient to only coat the high and low portions and not fill the depressions in the pattern. Coatings 19 and 21 are then fused by heating arrangement 23. The composite sheet 24 may then be stripped from the substrate 9 as by the arrangement 25.

The plastisols used in this invention are made according to well-known methods by mixing resins, plasticizers and stabilizers, coloring materials and other compounding ingredients as desired.

Although the invention is directed primarily to the use of polyvinyl chloride plastisol dispersions, it will be obvious that other alternate resin systems may be used. These would include, for example, polystyrene, polyethylene, polyacrylates, polyvinylidene chloride, polypropylene, polyesters, polyimides, silicones, cellulosics, acrylonitrile-butadiene-styrene, polyurethane and, epoxy.

The temperatures employed with the foregoing synthetic resin materials which may be used in this invention will depend upon the properties thereof and the plasticizers and solvents used therewith, as well understood in the art.

For any given mixture there will be a maximum and a minimum sheet thickness obtainable. Thicknesses between these limits can be obtained by proper selection of ranges, sizes, amounts, etc. of the previously stated factors involved.

The clear and colored plastisols used in this invention are preferably viscous liquids with a consistency somewhat similar to that of toothpaste. Each receptacle may contain a different color or combination of colors, clear or translucent plastisol.

The character of the marble pattern of the plastic sheet formed by this invention was found to be a function of several factors, including:

1. Viscosity of the plastisol.
2. Clearance of the ball above the receptacle socket.
3. Size, density and surface geometry of the ball.
4. Speed of travel of the ball on the substrate or movement of the substrate under the ball.
5. Lateral and/or vertical pattern followed by the ball and receptacle as it traverses the sheet.
6. Height of the plastisol in the receptacle.

Since the plastisol mixture 5 is substantially a heterogeneous one and, is rolled onto substrate 9 by applicator 8 in that condition, a former pattern may be substantially reproduced by controlling the colors of plastisol streams 1 and the rates of flow thereof, together with control of items 1 to 6 above.

As previously stated, it has also been found that improved pattern control and definition may be obtained by providing a notched surface 11 on the rim 10 of the opening 7 of the receptacle 4 as shown in FIG. III. This prevents a build-up of blended plastisol color in the bottom of the receptacle 4, and reduces the scraping action of the opening's rim on the ball.

The invention is further illustrated by forming a plastic marbleized sheet using clear, colored and translucent plastisols prepared according to the following formulations. All percentages are by weight unless otherwise specified.

I. A 30% filled, unpigmented translucent plastisol was formed as follows:

| | |
|---|---|
| Polyvinyl chloride resin | 50.04% |
| 2-2-4 Trimethyl 1-3 pentane diol monoisobutyrate benzoate | 11.61% |
| 2-2-4 Trimethyl 1-3 pentane diol diisobutyrate | 4.01% |
| Epoxy octyl tallate | 1.61% |
| Barium-zinc phenate, cadmium octoate diphenyl decyl phosphite | 1.43% |
| Calcium carbonate powder | 30.00% |
| Submicroscopic silicon dioxide | 1.30% |
| | 100.00% |

II. A pigmented plastisol was formed by adding a color dispersion consisting of 40% to 70% color in di(2-ethyl hexyl) phthalate. Two percent of this color dispersion was added to 98% of the formula of Roman Numeral I above.

III. A clear, unfilled unpigmented plastisol was formed as follows:

| | |
|---|---|
| Polyvinyl chloride resin | 75.60% |
| 2-2-4 Trimethyl 1-3 pentane diol monoisobutyrate benzoate | 15.00% |
| 2-2-4 Trimethyl 1-3 pentane diol diisobutyrate | 5.00% |
| Epoxy octyl tallate | 2.30% |
| Barium-zinc phenate, cadmium octoate diphenyl decyl phosphite | 2.10% |
| | 100.00% |

The formulations of I and II above were used to form a fluid marbleized coating on a substrate by applying the plastisols to the substrate in the manner previously described. This coating was then heat gelled. A top coating using formula III above was then applied to level the grained profile of the marbleized coating, after which, the coatings were fused by heat and the composite sheet was stripped from the substrate. A very good marbleized pattern sheet was obtained with the pattern extending clear through the thickness of the sheet.

The viscosity ranges for the above three plastisols were:

I. 30% filled, unpigmented translucent plastisol - 1,000 – 30,000 centipoises.

II. I above with 2% with color dispersion (40% to 70%) in di-2-ethyl hexyl phthalate - 1,000 to 30,000 centipoises.

III. Clear, unfilled, unpigmented plastisol - 500 – 2,000 centipoises.

The foregoing example illustrates but one of the many possible variations and materials, methods of application and treatment which may be useful in carrying out the invention.

Since natural marbles and like natural stone materials appear in almost infinite variety of colors and patterns, the invention is unlimited by either the colors which are employed or the patterns in which they are arranged. Obviously, the marbleizing plastisols could be individually applied as well as mixed and applied together as a heterogeneous mixture. It is also obvious that multiple receptacle and ball applicators could be used and that various movements could be imparted to the substrate as well as the applicators to achieve the desired patterns.

What is claimed is:

1. A method for producing a marbleized plastic sheet having a controlled and substantially reproducible pattern extending through the thickness of the sheet which comprises:

1. forming a heterogeneous vari-colored plastisol mixture by feeding separate streams of plastisol having differing colors and/or transparencies to a receptacle having rotatable fluid-applicating means positioned in an opening in the bottom thereof, said opening in the bottom thereof being formed with a rim which is serrated to minimize contact of the fluid-applicating means therewith and to facilitate flow of the plastisol therefrom,
    2. positioning said rotatable, ball-shaped, fluid-applicating means in contact with a substrate,
    3. moving said substrate thereby causing rotation of said fluid-applicating means and feeding thereby of the plastisol mixture from said receptacle onto the surface of said moving substrate,
    4. moving said fluid-applicating means in an irregular pattern while it is in contact with said moving substrate to form a marbleized pattern thereon,
    5. gelling the marbleized coating,
    6. Applying a clear plastisol coating onto the marbleized coating, and
    7. fusing the coatings to form a composite sheet consisting of the marbleized and clear plastisol coatings,
    8. and finally, the step of stripping the composite sheet from the substrate.

2. The method of claim 1, wherein, said fluid-applicating means is intermittently moved into and out of contact with said moving substrate to achieve desired design effects.

3. In the method of claim 1, the additional step of varying the spacing between the receptacle and the substrate while said fluid-applicating means is in contact with substrate to vary the spacing between the fluid-applicating means and the opening in the bottom of said receptacle to regulate the flow of plastisol therefrom.

4. The method according to claim 1, including controlling the design by feeding to the receptacle streams of plastisol having differing colors and/or transparencies.

5. The method according to claim 1, wherein, the plastisol is fed to the receptacle at a rate substantially equal to the rate at which it is being dispensed therefrom.

* * * * *